United States Patent [19]
Poli et al.

[11] Patent Number: 5,917,169
[45] Date of Patent: Jun. 29, 1999

[54] METHOD AND APPARATUS OF IDENTIFICATION OF CHARACTERS FORMED ON A PLURALITY OF TABLETS OF SILICON

[75] Inventors: Bernard Poli, Cox; Alain Poli, Aussonne, both of France

[73] Assignee: Recif, S.A., Aussonne, France

[21] Appl. No.: 08/901,486

[22] Filed: Jul. 28, 1997

[30] Foreign Application Priority Data

Jul. 29, 1996 [FR] France ................................. 96 09698

[51] Int. Cl.⁶ ............................ G06K 15/00; G06K 7/10; G06K 13/06; G06F 17/60
[52] U.S. Cl. ........................ 235/383; 235/385; 235/383; 235/462.2; 235/462.43; 235/462.44; 235/484; 235/485
[58] Field of Search ..................... 235/385, 383, 235/462.2, 462.43, 462.44, 484, 485

[56] References Cited

U.S. PATENT DOCUMENTS

| | | | |
|---|---|---|---|
| 4,582,987 | 4/1986 | Bianco | 235/486 |
| 4,585,931 | 4/1986 | Duncan et al. | 235/464 |
| 4,672,184 | 6/1987 | Fujiwara et al. | 235/462 |
| 4,794,238 | 12/1988 | Hampton | 235/462 |
| 4,812,631 | 3/1989 | Hiramatsu | 235/467 |
| 5,389,769 | 2/1995 | Yamashita et al. | 235/375 |
| 5,567,927 | 10/1996 | Kahn et al. | 235/462 |
| 5,703,348 | 12/1997 | Suzuki et al. | 235/472 |

*Primary Examiner*—Donald Hajec
*Assistant Examiner*—Daniel Sherr
*Attorney, Agent, or Firm*—Townsend and Townsend and Crew LLP

[57] ABSTRACT

Process for identifying characters, which are formed on a plurality (2) of silicon sheets, whereby the sheets are arranged in parallel planes ($P_0$) and are aligned relative to the support (1), and comprises:

inserting luminous reflector (5) between a first (2a) and a second (2b) successive sheet of the plurality of sheets starting from underneath the plurality of sheets;

illuminating the characters, which are formed on the first sheet, via the intermediacy of a first incident luminous ray ($R_1$) which is reflected by the luminous reflector and which are inserted between the first and the second successive sheets in such a way that the first incident luminous ray, which is reflected by part of the first sheet which is parallel to the parallel planes ($P_0$), shall be directed in a direction which is different from the direction of the optical axis of observation (AO);

observing the characters, which are being illuminated, of the first sheet in the direction of the optical axis, whereby the optical axis is rectilinear and arranged, at least in part, under the plurality of sheets.

identifying the characters which are being observed.

16 Claims, 3 Drawing Sheets

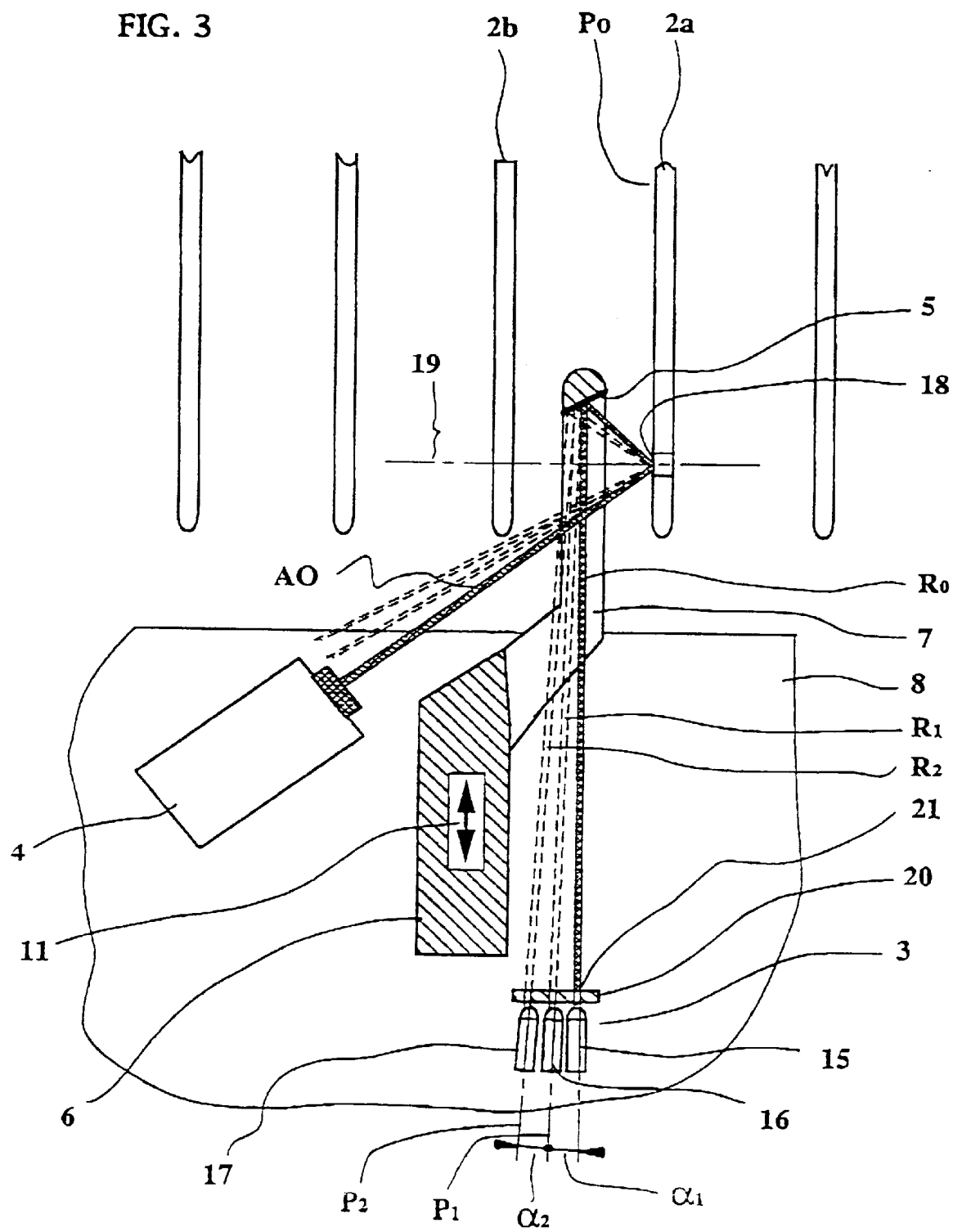

METHOD AND APPARATUS OF IDENTIFICATION OF CHARACTERS FORMED ON A PLURALITY OF TABLETS OF SILICON

BACKGROUND OF THE INVENTION

The present invention relates to processes and apparatus for identifying the characters which are formed on a plurality of sheets of silicon, whereby the sheets are arranged in parallel planes and are aligned relative to the means of support, and comprises at least illuminating the characters on a sheet, observing the illuminated characters and identifying the characters which have been observed.

The prior art teaches such a process and device, particularly by means of the document WO 91/10968. More especially, this document describes, in particular, an apparatus for identifying marks which are engraved on sheets of silicon which are aligned in a slide magazine, [i.e.] an apparatus in which a luminous ray is reflected by one or two mirrors before illuminating the marks, which are located on the sheet and which are to be identified, whereby the image of the marks, which have been illuminated in this way, is reflected by two mirrors before entering, the observation camera. In order to illuminate the marks, which are engraved on the sheets which are aligned in the slide magazine, the apparatus comprises means for raising the sheet, which is positioned directly in front of the sheet which is to be identified, in order to permit the placement of a mirror opposite the marks, the mirror being positioned at 45° relative to the plane which is defined by the sheet.

This apparatus exhibits the disadvantage of necessitating the manipulation of a sheet in order to permit the identification of another sheet, whereby this can engender the risk of particulate contamination of the sheets and, in addition, the identification times are slowed down by these manipulations. Moreover, this apparatus uses several mirrors in order to observe the illuminated marks, whereby this therefore entails increased complexity of the mechanisms and an elevated cost price for the apparatus and can cause errors in the identification of sheets which are due to multiple reflections of the image by the mirrors prior to entering the observation camera.

SUMMARY OF THE INVENTION

The present invention proposes, in particular, the removal of these disadvantages. More precisely, it comprises a process for identifying characters, which are formed on a plurality of sheets of silicon, whereby the said sheets are arranged in parallel planes and are aligned relative to the means of support, and comprises at least illuminating the characters on a sheet, observing the said illuminated characters, identifying the said observed characters and is characterized in that it comprises:

inserting means of luminous reflection between a first and a second successive sheet of the said plurality of sheets starting from underneath the said plurality of sheets;

illuminating the characters which are formed on the said first sheet via the intermediacy of a first incident luminous ray which is reflected by the said means of luminous reflection which are inserted between the said first and the said second successive sheet in such a way that the said first incident luminous ray, which is reflected by part of the said first sheet which is parallel to the said parallel planes, is directed in a direction which is different from the direction of the optical axis of observation;

observing the said illuminated characters of the said first sheet in the direction of the said optical axis, whereby the said optical axis is rectilinear and arranged, at least in part, under the said plurality of sheets.

The process in accordance with the invention permits one to identify the sheets without manipulating them and, at the same time, risks of errors are reduced to a minimum via the intermediacy of a direct optical axis between the means of observation, for example an electronic camera, and the characters which are to be identified on a sheet. As a result of the configuration which has been set up which avoids blinding the means of observation, moreover, the process in accordance with the invention permits the use and positioning of the means of luminous reflection for identifying characters which are formed faintly, by gravure or in relief, on the surface of the sheets of silicon.

According to one advantageous characteristic, the process in accordance with the invention comprises the insertion of the said means of luminous reflection above the said characters which are to be identified.

According to another advantageous characteristic, the process in accordance with the invention comprises arranging the said optical axis and the said means of luminous reflection, which are inserted between the said first and the said second successive sheet, in such a way that a second incident luminous ray is reflected by the said means of luminous reflection and by the said part of the said first sheet, which is parallel to the said parallel planes, in the direction of the said optical axis.

According to another advantageous characteristic, the said second incident luminous ray comprises at least one beam whereby one median axis is parallel to the said planes whereby the said sheets are arranged in accordance with these planes.

According to another advantageous characteristic, the said first incident luminous ray comprises at least one second beam, whereby one median axis is included in a first plane which forms an angle, which is greater than 0° and less than 3° and preferably equal to 2°, with the said parallel planes.

According to another advantageous characteristic, the said first incident luminous ray comprises at least one third beam, whereby one median axis is included in a second plane which forms an angle, which is greater than 0° and less than 3° and preferably equal to 2°, with the said first plane.

The present invention also has as its objective an apparatus which permits one to carry out a process of identifying characters, which are formed on a plurality of sheets of silicon, and comprises means of supporting the said sheets which permits an arrangement of the said sheets in accordance with parallel planes and alignment of the said sheets, means of illuminating the said characters, means of observing the said characters along an optical axis, means of identifying the characters which are being observed, characterized in that it comprises: mobile means of luminous reflection between a first position, in which the said means of luminous reflection are placed below the said plurality of sheets, and a second position, in which the said means of luminous reflection are inserted between a first and a second successive parallel plane which defines a first and a second successive sheet of the said plurality of sheets, means comprising arms which carry the said means of luminous reflection and whereby the said means comprising arms comprise a clear region, which is located below the said means of luminous reflection, and whereby the said clear region is positioned in part between the said first and second successive parallel planes, while the said means of luminous reflection adopt the said second position in a manner which permits one to pass through the said optical axis in a rectilinear direction between the said means of observing the said characters and the said characters which are being observed, and in that the said means of illuminating the said characters comprise a first incident luminous ray, which is reflected by the said means of luminous reflection in such a way that a luminous ray, which is reflected by one part of the sheet which is parallel to the said parallel planes and whose characters are being illuminated, shall be directed in a direction which is different from the said direction of the said optical axis.

Other characteristics and advantages will appear from reading that which follows regarding, an example of an embodiment of a process and of an apparatus in accordance with the invention which is accompanied by the appended drawings, whereby the example is given by way of illustration and without one being able to deduce any restrictive interpretation of the invention.

BRIEF DESCRIPTION OF THE DRAWINGS

FIG. 3 shows the detail of FIG. 2 during another phase of functioning of the apparatus in accordance with the invention.

DESCRIPTION OF THE PREFERRED EMBODIMENTS

Figure 1:
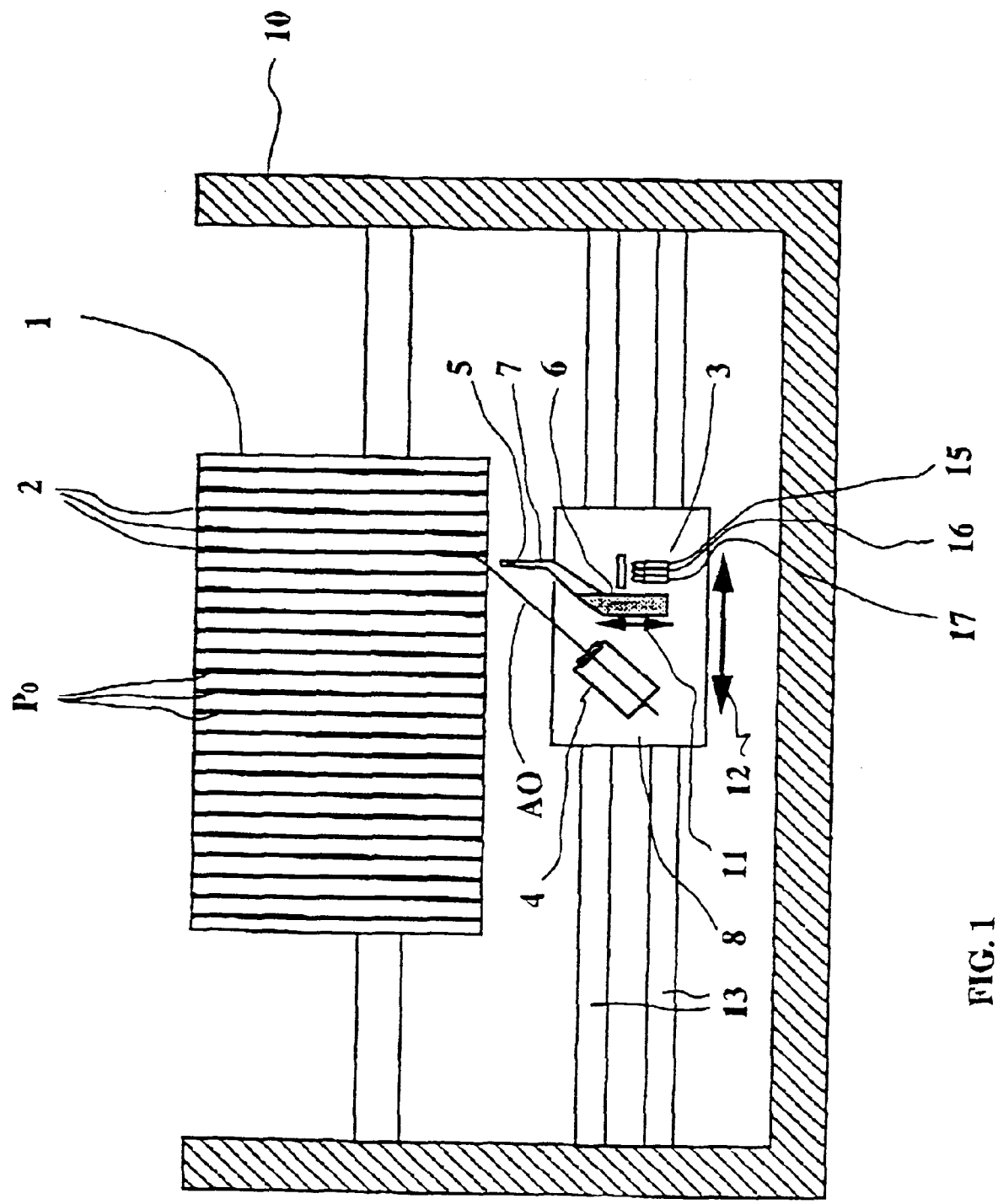
FIG. 1 shows a lateral schematic view in the form of a partial section of an example of a form of embodiment of an apparatus in accordance with the invention.

The apparatus shown in FIG. 1 comprises means of support 1 of the sheets of standard silicon 2 and forms a disk which permits an arrangement of the sheets in accordance with the parallel planes $P_0$ and an alignment of the sheets, means of illumination 3 of the characters formed on the sheets 2, means of observation 4 of these characters along an optical axis AO, means of identification (not shown) of the characters, means of mobile luminous reflection 5 between a first position, in which the means of luminous reflection 5 are placed below the sheets, and a second position, in which the means of luminous reflection 5 are inserted between a first and a second successive parallel plane which defines a first and a second successive parallel sheet of the plurality of sheets 2, means comprising arms 6 which carry the means of luminous reflection 5, whereby the means comprising arms 6 comprise a clear region 7 which is situated below the means of luminous reflection 5 and whereby the clear region 7 is positioned between the first and the second parallel successive planes $P_0$, while the means of luminous reflection adopt the second position in such a way as to permit one to pass through the optical axis AO in a rectilinear direction between the means of observation 4 of the characters and the characters which are being observed.

The apparatus, which is shown in FIG. 1, also comprises a platen 8 to which one has linked the means of observation 4, the means of illumination 3 and the means comprising arms 6 which carry the means of luminous reflection 7 [translator: 5?]. The platen 8 has a degree of freedom in terms of translation which permits parallel displacement relative to the alignment of the sheets 2 and under the sheets 2 in accordance with all known techniques, e.g. along the means of guidance formed by two guidance rods 13 in the direction 12, which is shown in FIG. 1, in such a way as to permit positioning of the means of luminous reflection between two successive sheets and vertically thereto or the positioning of [the means of] identification for the characters in the case of the first silicon sheet whose alignment is not preceded by any sheet. The displacement of the platen 8 along the guidance rods 13 can be ensured, for example, by a roller. which is fixed on the platen, and is brought about by a motor (not shown). The apparatus comprises a chassis 10 in accordance with all known techniques which permits the complete and rigid connection of the guidance rods 13, fixed reference positioning and maintenance of the means of support 1 of the sheets.

The means of support 1 are achieved in any known manner and define the generally standard separation of the sheets which is a function of the diameter thereof. This separation can give rise, for example, to a free space, which is available between two successive sheets, of approximately 5.5 mm in the case of plates with a diameter of 200 mm. The apparatus in accordance with the invention will comprise all known means which permit alignment of the characters, which are to be identified, in the lower part of the support approximately following a generator of the cylindrical envelope which contains the aligned sheets. The characters, which are to be identified, must in fact be aligned in the direction of displacement during the translation [movement] of the platen 8.

The means comprising arms 6 are joined to the platen 8 by a rigid link with a degree of freedom in translation (not shown) in accordance with all known means, e.g. a rack and pinion link, and can be displaced parallel to the planes of the sheets in the direction which is indicated by the arrow 11 in FIG. 1. The arm 6 will preferably be made from a rigid material in order to ensure precise positioning of the means of luminous reflection, e.g. it is made from a rigid plastic material. The means of luminous reflection 5 are formed by any surface which is capable of reflecting light. e.g. a plane mirror 5 which is fixed in a complete and rigid manner on the arm 6, e.g. by gluing. The part of the arm 6, which has to be inserted between two successive sheets, will have a thickness which is less than the distance which separates the two successive sheets, e.g. a thickness of the order of 3 mm. In FIG. 1, the arm 6 is shown in the first position in which the means of luminous reflection are placed below the sheets.

The means of illumination 3 advantageously comprise several electro-luminescent diodes. As shown in the figures, the means of illumination comprise at least one row of diodes and, advantageously, three rows of diodes 15, 16 and 17. The diodes are linked in a complete and rigid manner to the platen 8 and their position will be detailed later with the help of FIGS. 2 and 3. When the arm 6 adopts the second position, the luminous ray from the diodes should be reflected by the mirror 5 onto the characters which are to be identified.

Figure 2:
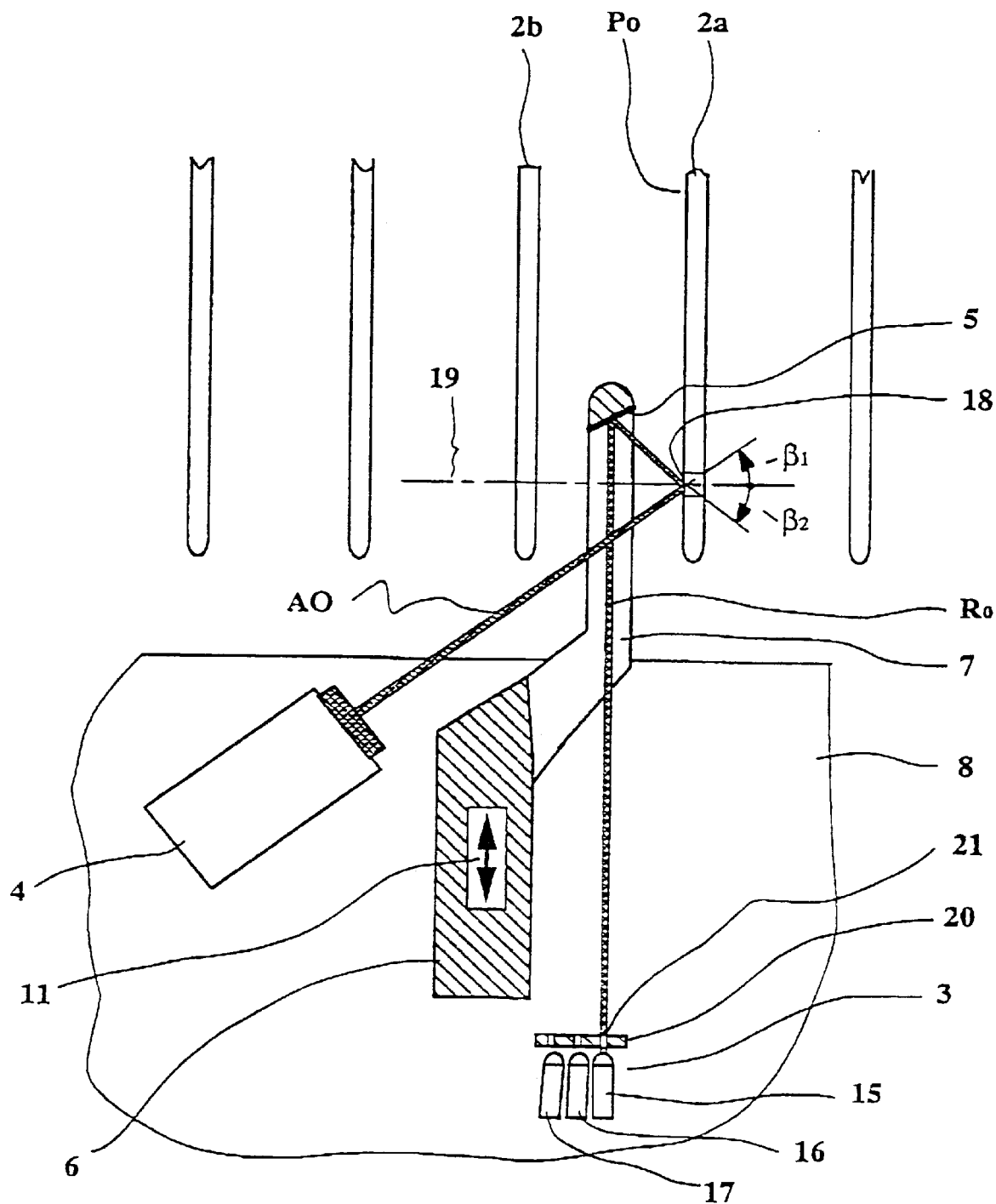
FIG. 2 shows an enlarged detail of the example of FIG. 1 during an advantageous phase of functioning of the apparatus in accordance with the invention.

The first row of diodes 15 advantageously serves for adjusting the optical axis AO and the position of the mirror 5 in the following manner: the first row 15 advantageously emits an incident luminous ray $R_0$ which is parallel to the parallel planes $P_0$ in accordance with which the sheets are arranged. The optical axis AO and the mirror 5, which is inserted between the first and second successive sheets $2a$ and $2b$ respectively, are arranged in such a way that the luminous ray $R_0$ will be reflected by the mirror 5 onto the characters, which are to be identified, and reflected by the part of the second sheet $2a$, which is parallel to the said parallel planes $P_0$, in the direction of the optical axis AO. This case is shown in FIG. 2.

The second and third rows of diodes 16 and 17 respectively, serve for illuminating the characters on a sheet which have to be identified. The second and third rows of diodes 16 and 17 respectively, emit an incident luminous ray $R_1$ and $R_2$ [respectively, each of] which is reflected by the mirror 5 in such a way that a luminous ray, which is reflected by part of the first sheet 2a which is parallel to the parallel plane $P_0$ and whose characters are being illuminated, shall be directed in a different direction from the direction of the optical axis AO. This is in order to avoid the means of observation 4 from becoming blinded by the luminous ray, which is reflected directly by the part of the first sheet 2a which is parallel to the parallel planes $P_0$, along the optical axis AO. This process permits one to improve the contrast of the image of the illuminated characters which have to be identified and which is received by the means of observation 4. This case is represented in FIG. 3. Such a process permits one to identify characters, which are formed by gravure or in relief, on the surface of silicon sheets, whereby these are [only] faintly engraved or faintly [visible] in relief, e.g. [where they are] engraved to a depth of 3 μm in the case of gravure.

The means of observation of the characters along an optical axis AO comprise an electronic camera 4 which is fixed in a complete and rigid manner and which is demountable and advantageously adjustable on the platen 8. The adjustment will permit the optical axis AO of the camera 8 to form an angle with a perpendicular to the parallel planes $P_0$ of between 20° and 65°—depending on the position and of the formation of the characters, which are to be identified, on the sheets—relative to the lower edge of these, whereby the optical axis AO is advantageously located in a vertical plane which is perpendicular to the parallel planes $P_0$, i.e. in the plane of the paper in FIG. 2 or 3.

The means of identification of the characters comprise image processing software and advantageously software for recognizing characters at neurone networks using any known method and interpreting the data, which are furnished by the electronic camera 4, in such a way as to identify the characters which are being observed.

FIG. 2 show, in an enlarged manner, the means of luminous reflection 5, the arm 6, the means of observation 4, and the means of illumination 3. In order to facilitate one's understanding of the figure, the platen 8 and the sheets of silicon are shown in part via a considerable enlargement. The arm 6 is inserted between two successive sheets 2a and 2b, i.e. it is placed in position for identifying the characters of the sheet 2a in the second position. The arm 6 can adopt any shape which is appropriate to the manner of ensuring its functioning which permits positioning of the mirror 5 between two successive sheets while permitting one to pass through the optical axis AO as defined above and, in the case of the example shown, to permit one to pass through the incident luminous rays, too. For this purpose, the arm 6 can advantageously assume a solid form with a central window 7 which is intended for one to pass through the optical axis AO and the luminous rays. The mirror 5, which is installed at the end of the arm as shown in FIG. 2 or the part of the arm which carries it, will preferably be installed in the form of a fork joint rather than as a cantilever, since the mirror has to be relatively insensitive to vibrations. As shown in FIG. 9, the shape of the arm 6 must permit one to place the three rows of diodes in such a way that the first row of diodes 15 advantageously emits an incident luminous ray in a plane which is parallel to the planes $P_0$. The form of the arm 6 has to permit a second row of diodes 16 and a third row of diodes 17, which are placed in accordance with the example between the first row of diodes 15 and the arm 6 as shown in the figures, to emit the rays $R_1$ and $R_2$ onto the mirror 5. It will be noted that the mirror 5 is located above the characters, which are to be identified, when the arm is in the position to identify the characters or in the second position.

The incident ray $R_0$, which is reflected by the mirror 5 onto the characters 18 which are to be identified, and the optical axis AO are symmetrical relative to a perpendicular 19 to the planes $P_0$ in the projection of the plane of FIG. 2. The position of the mirror 5 and of the optical axis AO will be such that, whatever the angle, which is formed by the incident ray $R_0$ with the planes $P_0$, and the angles $\beta_1$ and $\beta_2$, which are formed respectively by the incident ray $R_0$ which is reflected by the mirror 5 onto the characters 18, which are to be identified, and by the optical axis AO relative to the perpendicular 19 shall be equal as shown in FIG. 2.

Each row of diodes 15, 16, 17 can advantageously comprise a plurality of diodes which are advantageously aligned, for example six (not shown), and which are placed in a symmetrical manner relative to the plane of the paper which corresponds to the vertical plane of symmetry of the silicon sheets 2. The characters, which are to be identified are currently placed in the lower part of the sheet as shown in FIG. 2 and described above and are generally placed in a straight line. Because of this, the mirror 5 will be planar as explained above and the diodes of a row will be aligned in such a way that the median axes of the luminous rays, which are emitted respectively by each diode, will be parallel.

As shown in FIG. 2, the apparatus in accordance with the invention can comprise a means 20 which is designed to concentrate and homogenize the luminous beams, which are emitted by the diodes onto the zone of the plate which carries the characters IS which are to be identified, via the intermediacy of the mirror 5 in such a way as to avoid parasite reflections and to reduce the size of the electroluminescent diodes. This means 20 can be formed from any device for concentrating light and, especially, a rigid sheet 20 in which three distinct grooves 21 are arranged parallel to the three rows of diodes 15, 16, 17 respectively as shown in FIG. 2. The rigid sheet 20 is fixed in a rigid and complete manner to the diodes or the platen 8.

FIG. 3 is identical to FIG. 2 onto which the luminous rays $R_1$ and $R_2$, which are emitted respectively by the second row of diodes 16 and the third row of diodes 17, have been shown in order to understand better the functioning of the process in accordance with the invention. The incident luminous ray $R_1$, which is emitted by the second row of diodes 16, comprises at least one beam of which one median axis is included in a first plane $P_1$, which forms an angle $a_1$ which is greater than 0° and less than 3° and preferably equal to 2°, with the parallel planes $P_0$ while the ray $R_0$ is parallel to the plane $P_0$. The incident ray $R_2$, which is emitted by the third row of diodes 17 comprises at least one beam of which one median axis is included in a second plane $P_2$, which forms an angle $\alpha_2$ which is greater than 0° and less than 3° and preferably equal to 2° with the first plane $P_1$. The positioning, of the incident rays $R_1$ and $R_2$ relative to the incident ray $R_0$ permits one to ensure that the rays $R_1$ and $R_2$ will not be reflected in the direction of the optical axis AO of the parts of the external surface of the sheet which are parallel to the parallel planes $P_0$.

As shown in FIGS. 2 and 3, the optical axis AO of the camera 4 is rectilinear between the camera 4 and the characters 18 which are to be identified and this permits one to obtain an observation system which is direct, simple and dependable.

The apparatus in accordance with the invention will be equipped with all functional automation devices (not shown) which ensure, in particular, control of the position of the mirror via the intermediacy of the arm 6 and the platen 8 as a function of the reference position of the silicon sheets via the intermediacy of the support 1, of the chassis and—should the occasion arise—a program for identifying the sheets which are placed on the means of support 1.

Additionally to the rigid link with a degree of freedom in translation (not shown), the arm 6 will advantageously be linked to the platen 8 via the intermediacy of an adjustable link (not Shown) in order to permit the initial adjustment of the positioning of the mirror 5 in the second position conjointly with the adjustment, which is detailed above, of the optical axis AO in such a way that the incident luminous ray $R_0$ shall be reflected by the mirror 5 and by the part of a sheet, which is parallel to the parallel planes $P_0$, in the direction of the optical axis AO. This adjustment ensures that the rays $R_1$ and $R_2$, which are reflected by the mirror 5 and then by a part of the sheet which is parallel to the parallel planes $P_0$, shall be directed in directions which are different from the direction of the optical axis of observation AO. It is to be noted that luminous rays $R_0$, which are emitted by the first row of diodes 15, will not then be used any further during the identification of the silicon plates which are contained in the means of support 1.

We claim:

1. Process for identifying characters, which are formed on a plurality (2) of silicon sheets, whereby the said sheets are arranged in parallel planes ($P_0$) and are aligned relative to a means of support (1) and comprises at least illuminating the characters on a sheet, observing the said characters, which are being illuminated, and identifying the said characters, which are being observed, and is characterized in that it comprises:

inserting means of luminous reflection (5) between a first (2a) and a second (2b) successive sheet of the said plurality of sheets starting from underneath the said plurality of sheets;

illuminating the characters which are formed on the said first sheet via the intermediacy of a first incident luminous ray ($R_1$) which is reflected by the said means of luminous reflection, which are inserted between the said first and the said second successive sheet, in such a way that the said first incident luminous ray, which is reflected by part of the said first sheet which is parallel to the said parallel planes ($P_0$), shall be directed in a direction which is different from the direction of the optical axis of observation (AO);

observing the said characters, which are being illuminated, on the said first sheet along the said optical axis, whereby the said optical axis is rectilinear and arranged, at least in part, under the said plurality of sheets.

2. Process in accordance with claim 1, characterized in that it comprises inserting the said means of luminous reflection (5) above the said characters which are to be identified.

3. Process in accordance with claim 1 or 2, characterized in that it comprises arranging the said optical axis (AO) and the said means of luminous reflection (5), which are inserted between the said first (2a) and the said second (2b) successive sheets, in a way such that a second incident luminous ray ($R_0$) shall be reflected by the said means of luminous reflection and by the said part of the said first sheet, which is parallel to the said parallel planes ($P_0$), in the direction of the said optical axis (AO).

4. Process in accordance with claim 3, characterized in that the said second incident luminous ray comprises at least one first beam ($R_0$) of which one median axis is parallel to the said parallel planes ($P_0$) in accordance with which the said sheets have been arranged.

5. Process in accordance with claim 4, characterized in that the said first incident luminous ray comprises at least one second beam ($R_1$) of which one median axis is included in a first plane (P) which forms an angle ($\alpha_1$) which is greater than 0° and less than 3° with the said parallel planes ($P_0$).

6. Process in accordance with claim 5, characterized in that the said angle ($\alpha_1$) is approximately 2 degrees.

7. Process in accordance with claim 5, characterized in that the said first incident luminous ray comprises at least one third beam ($R_2$) of which one median axis is included in a second plane ($P_2$) which forms an angle ($\alpha_2$), which is greater than 0° and less than 3° with the said first plane ($P_1$).

8. Process in accordance with claim 7, characterized in that the said angle ($\alpha_2$) is approximately 2 degrees.

9. Apparatus which permits one to carry out a process for identifying the characters, which are formed on a plurality of silicon sheets, and comprises means of support (1) of the said sheets, which permits an arrangement of the said sheets in accordance with the parallel planes ($P_0$) and alignment of the said sheets, means of illumination (3) of the said characters, means of observation (4) of the said characters along an optical axis AO, means of identification of the characters, which are being observed, characterized in that it comprises mobile means of luminous reflection (5) between a first position, in which the said means of luminous reflection are placed below the said plurality of sheets, and a second position, in which the said means of luminous reflection are inserted between a first and a second successive parallel plane in accordance with which a first (2a) and a second (2b) successive sheet of the said plurality (2) of sheets are arranged, means comprising arms (6) which carry the said means of luminous reflection, whereby the said means comprising arms comprise a clear region (7) which is situated below the said means of luminous reflection, whereby the said clear region is positioned in part between the said first and second parallel successive planes, while the said means of luminous reflection adopt the second position in such a way as to permit one to pass through the said optical axis in a rectilinear direction between the said means of observation of the said characters and the said characters, which are being observed, and in that the said means of illuminating the said characters comprise a first incident luminous ray which is reflected by the said means of luminous reflection in such a way that a luminous ray, which is reflected by part of the sheet which is parallel to the said parallel planes ($P_0$) and of which the characters are being illuminated, shall be directed in a direction which is different from the said direction of the said optical axis.

10. Apparatus in accordance with claim 9, characterized in that the said second position of the said means of luminous reflection (5) is located above the said characters which are to be identified.

11. Apparatus in accordance with claim 9 or 10, characterized in that the said means of illumination comprise a second incident luminous ray ($R_0$) which is reflected by the said means of luminous reflection (5) which are inserted between the said first and second successive parallel planes which define the said first (2a) and second (2b) successive sheets in such a way that a luminous ray, which is reflected by a part of the sheet which is parallel to the said parallel sheets ($P_0$), shall be directed in the said direction of the said optical axis (AO).

12. Apparatus in accordance with claim 11, characterized in that the said second incident luminous ray comprises at least one beam ($R_0$) of which one median axis is parallel to the said planes ($P_0$) in accordance with which the said silicon sheets are arranged.

13. Apparatus in accordance with claim 12, characterized in that the said first incident luminous ray comprises at least one second beam ($R_1$) of which one median axis is included in a first plane ($P_1$) which forms an angle ($\alpha_1$) which is greater than 0° and less than 3° with the said planes ($P_0$).

14. Apparatus in accordance with claim 13, characterized in that the said angle ($\alpha_1$) is approximately 2 degrees.

15. Apparatus in accordance with claim 13, characterized in that the said first incident luminous ray comprises at least one third beam ($R_2$) of which one median axis is included in a second plane ($P_2$), which forms an angle ($\alpha_2$) which is greater than 0° and less than 3° with the said first plane ($P_1$).

16. Apparatus in accordance with claim 15, characterized in that the said angle ($\alpha_2$) is approximately 2 degrees.

* * * * *

UNITED STATES PATENT AND TRADEMARK OFFICE
CERTIFICATE OF CORRECTION

PATENT NO.    : 5,917,169
ISSUED        : June 29, 1999
INVENTOR(S)   : BERNARD POLI et al.

It is certified that error appears in the above-identified patent and that said Letters Patent is hereby corrected as shown below:

Column 6, line 34, delete "IS" and insert therefor --18--.

Column 8, line 13, delete "(P)" and insert therefor --($P_1$)--.

Signed and Sealed this

Second Day of November, 1999

Attest:

Q. TODD DICKINSON

*Attesting Officer*   Acting Commissioner of Patents and Trademarks